United States Patent
Gan et al.

(10) Patent No.: US 10,719,333 B2
(45) Date of Patent: Jul. 21, 2020

(54) BIOS STARTUP METHOD AND APPARATUS

(71) Applicant: HUAWEI TECHNOLOGIES CO., LTD., Shenzhen, Guangdong (CN)

(72) Inventors: Yezu Gan, Shenzhen (CN); Liangen Qiu, Hangzhou (CN); Yi Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 92 days.

(21) Appl. No.: 16/165,398

(22) Filed: Oct. 19, 2018

(65) Prior Publication Data

US 2019/0050240 A1 Feb. 14, 2019

Related U.S. Application Data

(63) Continuation of application No. PCT/CN2017/079627, filed on Apr. 6, 2017.

(30) Foreign Application Priority Data

Apr. 20, 2016 (CN) .......................... 2016 1 0248616

(51) Int. Cl.
*G06F 9/44* (2018.01)
*G06F 9/445* (2018.01)
*G06F 12/02* (2006.01)

(52) U.S. Cl.
CPC ............ *G06F 9/44505* (2013.01); *G06F 9/44* (2013.01); *G06F 12/023* (2013.01); *G06F 2212/1044* (2013.01)

(58) Field of Classification Search
CPC .... G06F 9/44502; G06F 9/44508; G06F 1/24; G06F 9/44526; G06F 15/177;
(Continued)

(56) References Cited

U.S. PATENT DOCUMENTS 6,336,185 B1 * 1/2002 Sargenti, Jr. .......... G06F 9/4405
713/1
7,552,319 B2 * 6/2009 Matheny ................ G06F 9/342
711/165
(Continued)

FOREIGN PATENT DOCUMENTS

| CN | 103475494 A | 12/2013 |
|----|-------------|---------|
| CN | 103530254 A | 1/2014 |
| CN | 105867945 A | 8/2016 |

OTHER PUBLICATIONS

International Search Report, dated Jul. 14, 2017, in International Application No. PCT/CN2017/079627 (4 pp.).
(Continued)

*Primary Examiner* — Zahid Choudhury
(74) *Attorney, Agent, or Firm* — Fish & Richardson P.C.

(57) ABSTRACT

A BIOS startup method is disclosed, the method includes: in a first access mode, allocating, by a current node, a local MMCFG in a space below a local access address of the current node that is a first address, and completing memory initialization; and when performing unified memory addressing of a system, moving positions of addresses of a part or an entirety of the MMCFG space of the current node from the original space below the first address in a global access address of the system to a space that is above the first address and can be accessed in a second access mode.

18 Claims, 9 Drawing Sheets

(58) Field of Classification Search
CPC .............. G06F 9/44514; G06F 9/44523; G06F 11/1417; G06F 9/44505
See application file for complete search history.

(56) References Cited

U.S. PATENT DOCUMENTS

| | | | | |
|---|---|---|---|---|
| 7,987,352 | B2* | 7/2011 | Harikumar | G06F 9/4401 713/1 |
| 2003/0120909 | A1* | 6/2003 | Zimmer | G06F 9/4401 713/2 |
| 2006/0069906 | A1 | 3/2006 | Zolnowsky et al. | |
| 2008/0162878 | A1* | 7/2008 | Zimmer | G06F 9/441 712/203 |
| 2008/0222338 | A1* | 9/2008 | Balasubramanian | G06F 9/5061 710/306 |
| 2016/0378509 | A1* | 12/2016 | Venkatasubba | G06F 9/4411 713/2 |
| 2018/0095889 | A1* | 4/2018 | Wang | G06F 9/44505 |

OTHER PUBLICATIONS

International Search Report, dated Jul. 14, 2017, in International Application No. PCT/CN2017/079627 (5 pp.).

Written Opinion of the International Searching Authority, dated Jul. 14, 2017, in International Application No. PCT/CN2017/079627 (9 pp.).

"Intel E8500 Chipset North Bridge (NB)," Mar. 2005, XP055566000, pp. 1-388.

Hojin Chang et al., "Insight Into the x86-64 Bare PC Application Boot/Load/Run Methodology," Sep. 25-27, 2013, XP055566306 (6 pp.).

Extended European Search Report, dated Mar. 18, 2019, in European Application No. 17785336.3 (12 pp.).

* cited by examiner

| Address | Contents | Group |
|---|---|---|
| 32 TB + 6 GB | CPU 3 CSR (64 MB) | MMCFG of node 7 |
| | CPU 2 CSR (64 MB) | |
| | CPU 1 CSR (64 MB) | |
| 32 TB + 5 GB + 768 MB | CPU 0 CSR (64 MB) | |
| | CPU 3 CSR (64 MB) | MMCFG of node 6 |
| | CPU 2 CSR (64 MB) | |
| | CPU 1 CSR (64 MB) | |
| 32 TB + 5 GB + 512 MB | CPU 0 CSR (64 MB) | |
| | CPU 3 CSR (64 MB) | MMCFG of node 5 |
| | CPU 2 CSR (64 MB) | |
| | CPU 1 CSR (64 MB) | |
| 32 TB + 5 GB + 256 MB | CPU 0 CSR (64 MB) | |
| | CPU 3 CSR (64 MB) | MMCFG of node 4 |
| | CPU 2 CSR (64 MB) | |
| | CPU 1 CSR (64 MB) | |
| 32 TB + 5 GB | CPU 0 CSR (64 MB) | |
| | CPU 3 CSR (64 MB) | MMCFG of node 3 |
| | CPU 2 CSR (64 MB) | |
| | CPU 1 CSR (64 MB) | |
| 32 TB + 4 GB + 768 MB | CPU 0 CSR (64 MB) | |
| | CPU 3 CSR (64 MB) | MMCFG of node 2 |
| | CPU 2 CSR (64 MB) | |
| | CPU 1 CSR (64 MB) | |
| 32 TB + 4 GB + 512 MB | CPU 0 CSR (64 MB) | |
| | CPU 3 CSR (64 MB) | MMCFG of node 1 |
| | CPU 2 CSR (64 MB) | |
| | CPU 1 CSR (64 MB) | |
| 32 TB + 4 GB + 256 MB | CPU 0 CSR (64 MB) | |
| | CPU 3 CSR (64 MB) | MMCFG of node 0 |
| | CPU 2 CSR (64 MB) | |
| | CPU 1 CSR (64 MB) | |
| 32 TB + 4 GB | CPU 0 CSR (64 MB) | |

FIG. 6

| Address | Block | Node |
|---|---|---|
| 3 GB + 960 MB | CPU 3 (32 MB) | MMIO space of node 7 |
| | CPU 2 (32 MB) | |
| | CPU 1 (64 MB) | |
| 3 GB + 768 MB | CPU 0 (64 MB) | |
| | CPU 3 (32 MB) | MMIO space of node 6 |
| | CPU 2 (32 MB) | |
| | CPU 1 (64 MB) | |
| 3 GB + 576 MB | CPU 0 (64 MB) | |
| | CPU 3 (32 MB) | MMIO space of node 5 |
| | CPU 2 (32 MB) | |
| | CPU 1 (64 MB) | |
| 3 GB + 384 MB | CPU 0 (64 MB) | |
| | CPU 3 (32 MB) | MMIO space of node 4 |
| | CPU 2 (32 MB) | |
| | CPU 1 (64 MB) | |
| 3 GB + 192 MB | CPU 0 (64 MB) | |
| | CPU 3 (32 MB) | MMIO space of node 3 |
| | CPU 2 (32 MB) | |
| | CPU 1 (64 MB) | |
| 3 GB | CPU 0 (64 MB) | |
| | CPU 3 (32 MB) | MMIO space of node 2 |
| | CPU 2 (32 MB) | |
| | CPU 1 (64 MB) | |
| 2 GB + 832 MB | CPU 0 (64 MB) | |
| | CPU 3 (32 MB) | MMIO space of node 1 |
| | CPU 2 (32 MB) | |
| | CPU 1 (64 MB) | |
| 2 GB + 640 MB | CPU 0 (64 MB) | |
| | CPU 3 (32 MB) | MMIO space of node 0 |
| | CPU 2 (32 MB) | |
| | CPU 1 (64 MB) | |
| 2 GB + 256 MB | CPU 0 (256 MB) | |

FIG. 7

BIOS STARTUP METHOD AND APPARATUS

CROSS-REFERENCE TO RELATED APPLICATIONS

This application is a continuation of International Application No. PCT/CN2017/079627, filed on Apr. 6, 2017, which claims priority to Chinese Patent Application No. 201610248616.X, filed on Apr. 20, 2016. The disclosures of the aforementioned applications are hereby incorporated by reference in their entireties.

TECHNICAL FIELD

This application relates to the computer field, and in particular, to a basic input/output system (Basic Input/ Output System, BIOS) startup method and apparatus.

BACKGROUND

With development of science and technology, more high-performance servers are applied to scientific research and enterprise business activities. A large-scale x86 cache coherent non-uniform memory access (Cache Coherent Non-Uniform Memory Access, CC-NUMA) architecture system is widely applied by virtue of its features such as high performance, high scalability, and an easily programmable environment.

In the large-scale CC-NUMA system, generally a plurality of separate server mainboards (node boards) are interconnected by a cache coherent interconnect network to form a large server that runs only one operating system. Generally, in the large-scale x86 CC-NUMA multi-CPU system, based on each 2-CPU or 4-CPU node board, a BIOS of each node board is usually started first; in a BIOS startup process of each node board, unified memory addressing is performed, and a global address space of the system is configured; subsequently, in a phase of the BIOS process, each node is incorporated into one BIOS process for management and startup; and a complete multi-CPU system is formed by using this BIOS and provided to an operating system.

In an earlier phase of BIOS startup, because a CPU runs in a 32-bit (bit) mode, only a 4-kilomegabyte (Kilomega-Byte, GB) address space can be addressed. In addition, because each node board needs to access a memory mapped configuration (Memory Mapped config, MMCFG) space during memory initialization, space addressing in a position below 4 GB is required for the MMCFG space.

However, as a quantity of central processing units (Central Processing Unit, CPU) included in the large-scale CC-NUMA system increases, a size of an MMCFG space occupied by each CPU is fixed, and the MMCFG space in the position below 4 GB also increases. Because an address capacity in the position below 4 GB is fixed and limited, on one hand, a memory mapped input/output (Memory Mapped Input/Output, MMIO) space is caused to decrease, and the relatively small MMIO space limits a quantity and functions of Peripheral Component Interface Express (PCIE) devices. Consequently, the large-scale CC-NUMA system product has low compatibility with the PCIE devices. On the other hand, an available memory address space below 4 GB is also caused to decrease, and excessively low memory may cause a compatibility problem that the operating system cannot be started.

SUMMARY

Embodiments of this application provide a BIOS startup method and apparatus, so that BIOS startup does not affect available spaces of an MMIO space and an available memory space in a lower address while a quantity of CPUs included in a large-scale CC-NUMA system is extended, and large-scale CC-NUMA system is more compatible with PCIE devices and an operating system.

To achieve the foregoing objectives, the following technical solutions are used in this application:

According to a first aspect, a BIOS startup method is provided, and applied to a current node, where the current node is a master node or a slave node in a large-scale CC-NUMA system, the CC-NUMA system includes one master node and at least one slave node, and the method includes:

entering a first access mode, where a maximum access address of the current node in the first access mode is a first address, and performing the following steps in the first access mode:

allocating a local memory mapped configuration MMCFG space of the current node in a space below a local access address of the current node that is the first address;

performing memory initialization by accessing the local MMCFG space of the current node;

after memory initialization is completed, performing unified memory addressing of the system, and allocating, in a global access address of the system, addresses of the MMCFG space of the current node, where an entirety or a part of the MMCFG space of the current node is a space that is above the global access address being the first address and can be accessed in a second access mode;

allocating, in the global access address of the system, a memory mapped input/output MMIO space to the current node; and interacting with at least one other node in the system, completing node combination of the system, and forming a complete system; and entering the second access mode, where an address space that can be accessed by the current node in the second access mode is greater than an address space that can be accessed by the current node in the first access mode.

The large-scale CC-NUMA system includes a plurality of nodes. In the plurality of nodes, one node is selected as the master node, and other nodes are slave nodes.

In an actual application, the slave nodes may also be referred to as dependent nodes or non-master nodes. They are a same concept and are interchangeable in this application.

It should be noted that, a process of determining the master node and a slave node in the large-scale CC-NUMA system is not described in this application.

In the MMCFG space, a storage space addressed below the first address is referred to as MMCFGL, and a storage space addressed above the first address is referred to as MMCFGH.

Specifically, the allocating a local MMCFG space of the current node and addresses of the MMCFG space in a global access address of the system may be implemented by configuring a register.

By configuring an MMCFG_Rule (memory mapped configuration space rule) register, the current node may allocate, in the space below the local access address that is the first address, a part of the space as a local MMCFG space of a node, and by configuring an MMCFG_Target_LIST (memory mapped configuration space target list) register, may set the local MMCFG space configured in the space below the first address by the MMCFG_Rule register, as the local MMCFG space of the current node.

It should be noted that, the MMCFG_Target_LIST register may be configured and used to set to which node the allocated local MMCFG space corresponds, that is, to which node the local MMCFG space is allocated.

By configuring a DRAM Rule (memory addressing rule) register, the current node may perform unified memory addressing, allocate a part of a space as addresses of an MMCFG space of a node in the global access address of the system, and by using configuring an INTERLEAVE_LIST (memory interleaving target list) register, set the addresses configured in the global access address of the system by the DRAM Rule register, as the addresses of the MMCFG space of the current node in the global access address of the system.

Each node included in the large-scale CC-NUMA system includes at least one central processing unit (Central Processing Unit, CPU). In an MMCFG space (including a local MMCFG space or addresses of an MMCFG space in the global access address of the system) of a node, MMCFG spaces of all CPUs are connected in sequence and are not duplicate, and a first address of an MMCFG space of one CPU is a last address of an MMCFG space of another CPU.

Specifically, when the MMIO space is allocated to the current node according to a requirement of a peripheral component of the current node, a space as large as possible may be allocated in any address position in the global access address of the system to satisfy the requirement of the peripheral component of the current node.

In this way, in the first access mode, the current node allocates the local MMCFG in the space below the local access address of the current node that is the first address, and completes memory initialization; and when performing unified memory addressing of the system, the current node moves positions of addresses of a part or an entirety of the MMCFG space of the current node from the original space below the first address in the global access address of the system to a space that is above the first address and can be accessed in the second access mode. This ensures that a CPU can still access the addresses of the MMCFG space in the global access address of the system in the second access mode. In addition, spaces that are below the first address and are saved by moving may be reserved for devices (for example, more MMIO spaces are reserved for use by PCIe cards that can be accessed only below 4 GB, and more available memory spaces are reserved for use by the system) that can be used only in the spaces. Even if a quantity of CPUs included in the CC-NUMA system is extended continuously, the addresses of the MMCFG space in the global access address of the system may not occupy any space below the first address, and therefore, more PCIE devices can be supported. Therefore, BIOS startup does not affect available spaces of an MMIO space and an available memory space in a lower address while the quantity of CPUs included in the large-scale CC-NUMA system is extended, and large-scale CC-NUMA system is more compatible with PCIE devices and an operating system.

With reference to the first aspect, in a first possible implementation of the first aspect, the first address may be 4 GB.

The first access mode may be a 32-bit mode in an x86 system. In this mode, a maximum access address is 4 GB.

Therefore, it can be learned that, in the 32-bit mode in the x86 system, same as in the first aspect, in the first possible implementation, more spaces below 4 GB may be reserved for use by peripheral components (such as PCIE cards) of nodes, and compatibility of the large-scale CC-NUMA system with peripheral components is improved.

With reference to the first aspect or the first possible implementation of the first aspect, in a second possible implementation of the first aspect, during unified memory addressing of the system, the addresses of the MMCFG space of the current node in the global access address of the system need to be allocated in a space that is above the global access address being the first address and can be accessed in the second access mode, but the current mode is the first access mode; therefore, in this case, the current node cannot access the MMCFG space of the current node, and the master node may reserve a local MMCFG space of the master node; and all nodes in the system perform unified memory addressing of the system by accessing the MMCFG space of the master node, and respectively allocate, in the global access address of the system, addresses of MMCFG spaces of the nodes.

Further, if the current node is the master node, after performing memory initialization by accessing the local MMCFG space of the current node, the method may further include:

reserving the local MMCFG space of the master node, used by each node in the system to perform unified memory addressing of the system and allocate, in the global access address of the system, addresses of the MMCFG space of the node.

Therefore, it can be learned that, the reserved local MMCFG space of the master node below the first address may be not only used by each node in the system to perform unified memory addressing of the system and allocate, in the global access address of the system, the addresses of the MMCFG space of each node, but also used when only a space below the first address can be accessed when some drivers need to access some hardware device configuration registers in the first access mode, so as to improve system compatibility when the MMCFG space is accessed.

With reference to the first aspect or the first possible implementation of the first aspect or the second possible implementation of the first aspect, in a third possible implementation of the first aspect, before the entering the second access mode, the method may further include:

configuring a page table in the space below the local access address of the current node that is the first address, where the page table points to an address space that can be accessed by the current node in the second access mode and cannot be accessed by the current node in the first access mode; and after the entering the second access mode, the method may further include:

accessing, in the global access address of the system, an address of the MMCFG space of the current node according to the page table.

Specifically, accessing the MMCFG space allocated above the first address can be supported only after the second access mode is entered. To implement access to the space above the first address, the page table may be configured in the storage space below the first address. The page table points to the address space that can be accessed by the current node in the second access mode and cannot be accessed by the current node in the first access mode. By accessing the configured page table, the node can access the MMCFG space allocated above the first address.

Specific content of the page table and a specific location of the page table in the storage space below the first address may be set according to an actual requirement, and are not specifically limited in this application. In the global access address of the system, any access to an address space of the MMCFG space of the current node above the first address by using the page table in the large-scale CC-NUMA system shall fall within the protection scope of this application.

In this way, in the third possible implementation of the first aspect, accessing an address allocated above the first address in the first aspect or any possible implementation by configuring the page table can better achieve an effect of the first aspect or any possible implementation.

With reference to any one of the first aspect or the first possible implementation of the first aspect to the third possible implementation of the first aspect, in a fourth possible implementation of the first aspect, in the global access address of the system, addresses of an MMCFG space of one node do not overlap addresses of an MMCFG space of any other node in the CC-NUMA system.

In the CC-NUMA system, because the addresses of the MMCFG space of each node in the global access address of the system are addresses that need to be accessed when each node accesses a peripheral component, when the addresses do not overlap each other, the nodes may not interfere mutually when accessing peripheral components, and system performance is improved.

With reference to any one of the first aspect or the first possible implementation of the first aspect to the fourth possible implementation of the first aspect, in a fifth possible implementation of the first aspect, the addresses of the MMCFG space of each node in the CC-NUMA system are successive in the global access address of the system, and a first one of addresses of an MMCFG space of a node in the global access address of the system is a last one of addresses of an MMCFG space of another node in the global access address of the system.

When the addresses of the MMCFG space of each node in the CC-NUMA system are successive in the global access address of the system, each node may access MMCFG spaces of other nodes, and the nodes may be interconnected. In addition, access becomes more regular, that is, unified access is facilitated.

With reference to any one of the first aspect or the first possible implementation of the first aspect to the fifth possible implementation of the first aspect, in a sixth possible implementation of the first aspect, if the current node is the master node, the interacting with at least one other node in the system, completing node combination of the system, and forming a complete system may be implemented in the following process:

sending a notification message to each slave node in the CC-NUMA system, where the notification message is used to instruct the slave node to send system information about the slave node to the master node; and separately receiving the system message sent by each slave node about the slave node, completing the node combination of the system, and forming the complete system.

The sixth possible implementation of the first aspect provides a specific method for completing the node combination of the system and forming the complete system by the master node, to achieve effects of the foregoing possible implementations.

With reference to any one of the first aspect or the first possible implementation of the first aspect to the sixth possible implementation of the first aspect, in a seventh possible implementation of the first aspect, if the current node is the slave node, the interacting with at least one other node in the system, completing node combination of the system, and forming a complete system may be implemented in the following process:

terminating a BIOS process of the slave node;

receiving a notification message that is sent by the master node and used to instruct the slave node to send system information about the slave node to the master node; and sending the system message about the slave node to the master node, where the system message is used by the master node to complete the node combination of the system and form the complete system.

The seventh possible implementation of the first aspect provides a specific method for completing the node combination of the system and forming the complete system by the master node, to achieve effects of the foregoing possible implementations.

With reference to any one of the first aspect or the first possible implementation of the first aspect to the seventh possible implementation of the first aspect, in an eighth possible implementation of the first aspect, the interacting with at least one other node in the system, completing node combination of the system, and forming a complete system may be implemented in the following process:

after accessing a CPU register for a last time, interacting with the at least one other node in the system, completing the node combination of the system, and forming the complete system.

In this way, in the eighth possible implementation of the first aspect, the current node performs the BIOS merger and forms the complete system after accessing the CPU register for the last time, so that memory initialization of each node is independent, that is, each node performs memory initialization in parallel. Therefore, a startup time is reduced.

According to a second aspect, a BIOS startup apparatus is provided, where the startup apparatus is included in a current node, the current node is a master node or a slave node in a large-scale CC-NUMA system, the CC-NUMA system includes one master node and at least one slave node, and the startup apparatus includes:

a mode unit, configured to control the system to enter a first access mode, where a maximum access address of the current node in the first access mode is a first address;

an allocation unit, configured to allocate a local memory mapped configuration MMCFG space of the current node in a space below a local access address of the current node that is the first address;

an initialization unit, configured to perform memory initialization by accessing the local MMCFG space of the current node that is allocated by the allocation unit; where the allocation unit is further configured to: after the initialization unit completes memory initialization, perform unified memory addressing of the system, and allocate, in a global access address of the system, addresses of the MMCFG space of the current node, where an entirety or a part of the MMCFG space of the current node is a space that is above the global access address being the first address and can be accessed in a second access mode; and the allocation unit is further configured to allocate, in the global access address of the system, a memory mapped input/output MMIO space to the current node; and a merger unit, configured to interact with at least one other node in the system, complete node combination of the system, and form a complete system; where the mode unit is further configured to control the system to enter the second access mode from the first access mode, where an address space that can be accessed by the current node in the second access mode is greater than an address space that can be accessed by the current node in the first access mode.

With reference to the second aspect, in a first possible implementation of the second aspect, the first address is 4 GB.

With reference to the second aspect or the first possible implementation of the second aspect, in a second possible implementation of the second aspect, the allocation unit is specifically configured to:

by accessing a local MMCFG space of the master node, perform unified memory addressing of the system, and allocate, in the global access address of the system, the addresses of the MMCFG space of the current node.

With reference to the second aspect or the first possible implementation of the second aspect or the second possible implementation of the second aspect, in a third possible implementation of the second aspect, the apparatus further includes:

a configuration unit, configured to configure, before the mode unit controls the system to enter the second access mode from the first access mode, a page table in the space below the local access address of the current node that is the first address, where the page table points to an address space that can be accessed by the current node in the second access mode and cannot be accessed by the current node in the first access mode; and an access unit, configured to access, in the global access address of the system after the mode unit controls the system to enter the second access mode from the first access mode, an address of the MMCFG space of the current node according to the page table configured by the configuration unit.

With reference to any one of the second aspect or the first possible implementation of the second aspect to the third possible implementation of the second aspect, in a fourth possible implementation of the second aspect, in the global access address of the system, addresses of an MMCFG space of one node do not overlap addresses of an MMCFG space of any other node in the CC-NUMA system.

With reference to any one of the second aspect or the first possible implementation of the second aspect to the fourth possible implementation of the second aspect, in a fifth possible implementation of the second aspect, addresses of an MMCFG space of each node in the CC-NUMA system are successive in the global access address of the system, and a first one of addresses of an MMCFG space of a node in the global access address of the system is a last one of addresses of an MMCFG space of another node in the global access address of the system.

With reference to any one of the second aspect or the first possible implementation of the second aspect to the fifth possible implementation of the second aspect, in a sixth possible implementation of the second aspect, if the current node is the master node, the merger unit is specifically configured to:

send a notification message to each slave node in the CC-NUMA system, where the notification message is used to instruct the slave node to send system information about the slave node to the master node; and separately receive the system message sent by each slave node about the slave node, complete the node combination of the system, and form the complete system.

With reference to any one of the second aspect or the first possible implementation of the second aspect to the sixth possible implementation of the second aspect, in a seventh possible implementation of the second aspect, if the current node is the slave node, the merger unit is specifically configured to:

terminate a BIOS process of the slave node;

receive a notification message that is sent by the master node and used to instruct the slave node to send system information about the slave node to the master node; and send the system message about the slave node to the master node, where the system message is used by the master node to complete the node combination of the system and form the complete system.

With reference to any one of the second aspect or the first possible implementation of the second aspect to the seventh possible implementation of the second aspect, in an eighth possible implementation of the second aspect, the merger unit is specifically configured to:

after accessing a central processing unit CPU register for a last time, interact with the at least one other node in the system, complete the node combination of the system, and form the complete system.

The apparatus provided by the second aspect or any possible implementation of the second aspect is used to implement the BIOS startup method in the first aspect or any possible implementation of the first aspect, and can achieve a same technical effect.

According to a third aspect, a BIOS startup apparatus is provided, where the startup apparatus is included in a current node, the current node is a master node or a slave node in a large-scale CC-NUMA system, the CC-NUMA system includes one master node and at least one slave node, and the startup apparatus includes:

a processor, configured to control the system to enter a first access mode, where a maximum access address of the current node in the first access mode is a first address, and the processor is further configured to perform the following steps in the first access mode:

allocating a local memory mapped configuration MMCFG space of the current node in a space below a local access address of the current node that is the first address;

performing memory initialization by accessing the local MMCFG space of the current node;

after memory initialization is completed, performing unified memory addressing of the system, and allocating, in a global access address of the system, addresses of the MMCFG space of the current node, where an entirety or a part of the MMCFG space of the current node is a space that is above the global access address being the first address and can be accessed in a second access mode;

allocating, in the global access address of the system, a memory mapped input/output MMIO space to the current node; and interacting with at least one other node in the system, completing node combination of the system, and forming a complete system; and control the system to enter the second access mode from the first access mode, where an address space that can be accessed by the current node in the second access mode is greater than an address space that can be accessed by the current node in the first access mode.

With reference to the third aspect, in a first possible implementation of the third aspect, the first address is 4 GB.

With reference to the third aspect or the first possible implementation of the third aspect, in a second possible implementation of the third aspect, the processor is specifically configured to:

by accessing a local MMCFG space of the master node, perform unified memory addressing of the system, and allocate, in the global access address of the system, the addresses of the MMCFG space of the current node.

With reference to the third aspect or the first possible implementation of the third aspect or the second possible implementation of the third aspect, in a third possible implementation of the third aspect, the processor is further configured to:

before entering the second access mode from the first access mode, configure a page table in the space below the local access address of the current node that is the first address, where the page table points to an address space that can be accessed by the current node in the second access mode and cannot be accessed by the current node in the first access mode; and after entering the second access mode from the first access mode, access, in the global access address of the system, an address of the MMCFG space of the current node according to the page table configured by the configuration unit.

With reference to any one of the third aspect or the first possible implementation of the third aspect to the third possible implementation of the third aspect, in a fourth possible implementation of the third aspect, in the global access address of the system, addresses of an MMCFG space of one node do not overlap addresses of an MMCFG space of any other node in the CC-NUMA system.

With reference to any one of the third aspect or the first possible implementation of the third aspect to the fourth possible implementation of the third aspect, in a fifth possible implementation of the third aspect, addresses of an MMCFG space of each node in the CC-NUMA system are successive in the global access address of the system, and a first one of addresses of an MMCFG space of a node in the global access address of the system is a last one of addresses of an MMCFG space of another node in the global access address of the system.

With reference to any one of the third aspect or the first possible implementation of the third aspect to the fifth possible implementation of the third aspect, in a sixth possible implementation of the third aspect, if the current node is the master node, the processor is specifically configured to:

send a notification message to each slave node in the CC-NUMA system, where the notification message is used to instruct the slave node to send system information about the slave node to the master node; and separately receive the system message sent by each slave node about the slave node, complete the node combination of the system, and form the complete system.

With reference to any one of the third aspect or the first possible implementation of the third aspect to the sixth possible implementation of the third aspect, in a seventh possible implementation of the third aspect, if the current node is the slave node, the processor is specifically configured to:

terminate a BIOS process of the slave node;

receive a notification message that is sent by the master node and used to instruct the slave node to send system information about the slave node to the master node; and send the system message about the slave node to the master node, where the system message is used by the master node to complete the node combination of the system and form the complete system.

With reference to any one of the third aspect or the first possible implementation of the third aspect to the seventh possible implementation of the third aspect, in an eighth possible implementation of the third aspect, the processor is specifically configured to:

after accessing a central processing unit CPU register for a last time, interact with the at least one other node in the system, complete the node combination of the system, and form the complete system.

The BIOS startup apparatus provided by the second aspect or the third aspect or any one of the foregoing possible implementations is used to implement the BIOS startup method in the first aspect or any possible implementation of the first aspect, and can achieve a same technical effect.

The BIOS startup method and apparatus provided by the embodiments of this application are applied to the master node or the slave node in the large-scale CC-NUMA system. In the first access mode, the current node allocates the local MMCFG in the space below the local access address of the current node that is the first address, and completes memory initialization; and when performing unified memory addressing of the system, the current node moves positions of addresses of a part or an entirety of the MMCFG space of the current node from the original space below the first address in the global access address of the system to a space that is above the first address and can be accessed in the second access mode. This ensures that a CPU can still access the addresses of the MMCFG space in the global access address of the system in the second access mode. In addition, spaces that are below the first address and are saved by moving may be reserved for devices (for example, more MMIO spaces are reserved for use by PCIe cards that can be accessed only below 4 GB, and more available memory spaces are reserved for use by the system) that can be used only in the spaces. Even if a quantity of CPUs included in the CC-NUMA system is extended continuously, the addresses of the MMCFG space in the global access address of the system may not occupy any space below the first address, and therefore, more PCIE devices can be supported. Therefore, BIOS startup does not affect available spaces of an MMIO space and an available memory space in a lower address while the quantity of CPUs included in the large-scale CC-NUMA system is extended, and large-scale CC-NUMA system is more compatible with PCIE devices and an operating system.

BRIEF DESCRIPTION OF DRAWINGS

FIG. 6 is a schematic diagram of another MMCFG space addressing according to an embodiment of this application;

FIG. 7 is a schematic diagram of MMIO space addressing according to an embodiment of this application;

DESCRIPTION OF EMBODIMENTS

Figure 1:
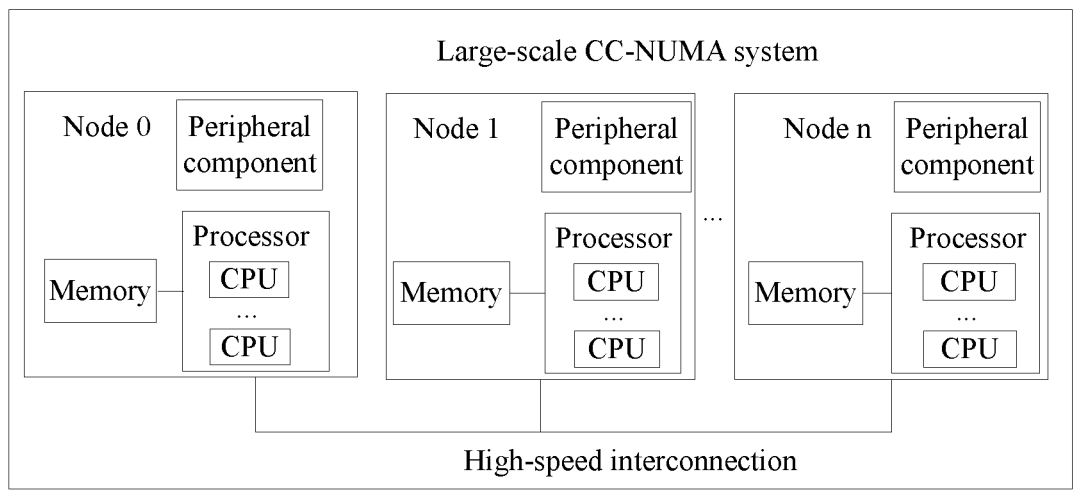
FIG. 1 is an architecture diagram of a large-scale CC-NUMA system.

In a large-scale CC-NUMA system, generally a plurality of separate server mainboards are interconnected by a cache coherent (Cache Coherent) interconnect network to form a large server that runs only one operating system. FIG. 1 shows an architecture of a large-scale CC-NUMA system, including a node 1 to a node n. Each node includes a processor, a memory, a peripheral component, and other modules. Nodes are interconnected at a high speed to form a complete system.

Each node may include one or more processors (such as x86 CPUs). Each CPU corresponds to one or more physical memories. The physical memory, as one of devices of the processor, is addressed together with other devices (such as a register and a peripheral component). Subsequently, by using an address after the addressing, each CPU accesses a physical memory corresponding to the CPU. Unified addressing and access are performed based on the prior art. Details are not described in this embodiment. It should be noted that, in FIG. 1, for ease of illustration, one or more physical memories corresponding to each CPU are not shown, but each physical memory in a node is indicated simply by using one memory module.

The processor in the node is connected to a peripheral component (for example, a PCIE device widely used currently) to implement a plurality of applications in the large-scale CC-NUMA system. A quantity of PCIE devices that the processor can support depends on a size of an MMIO space of the processor.

Each PCIE device has a configuration space storing basic feature information of the device. By configuring the configuration space, function setting work such as address allocation of a storage space of the PCIE device is completed. The configuration space of the PCIE device is mapped to a physical address space of a memory, namely, an MMCFG space. When the PCIE device needs to be accessed by using the processor, the PCIE device may be accessed by accessing the MMCFG space.

Generally, the large-scale x86 CC-NUMA system includes a plurality of node boards. Generally, each node board may include two CPUs or four CPUs (one CPU is generally referred to the quantity of CPU is one). Generally, the system is designed to have 16 CPUs, 32 CPUs, or 64 CPUs. In a BIOS startup phase, each node board first performs BIOS startup separately. Subsequently, each node board performs node combination, and a complete multi-CUP system is formed and provided to an operating system. The CPU runs in a 32-bit mode in an earlier phase of BIOS startup, a phase of performing security (Security, SEC) authentication, and most time (except a later period) of a pre-extensible firmware interface (Extensible Firmware Interface, EFI) initialization (Pre-EFI Initialization, PEI) phase, and can address a physical address space below 4 GB ($2^{32}$) in the memory only. The x86 CPU already uses most configuration registers of the CPU as PCI standard registers (that is, the x86 CPU manages an integrated memory controller as a PCIE device, and software in the system may access a register of the memory controller in a manner of accessing a PCIE standard register). In this phase, a quick path interconnect (Quick Path Interconnect, QPI) initialization program needs to be executed and memory initialization needs to be performed. In both operations, the MMCFG space needs to be accessed. Further, because the system runs in the 32-bit mode in this case, the MMCFG space needs to be configured in a position below 4 GB, so that the CPU can access the space. It should be noted that, in this embodiment and the following embodiments, "accessing" a space includes reading from and writing into the space. "Accessing a space" may also be referred to as "accessing an address space", or "accessing an address". For ease of description, the expressions are not strictly distinguished in this embodiment and other embodiments.

For example, the large-scale CC-NUMA system has 32 CPUs. Assuming that the node has four CPUs (that is, including four CPUs), when the node is started, a size of an MMCFG space that each node needs to use is one segment (segment), and eight segments in total are required. One segment occupies 256 megabytes (megabytes, MB), and MMCFG spaces of the 32 CPUs require 2 GB (8×256 MB).

In this case, a 256 MB MMCFG space below 4 GB is allocated to each node, and a total size is 2 GB. Address space allocation is shown in the following FIG. 2.

Figure 2:
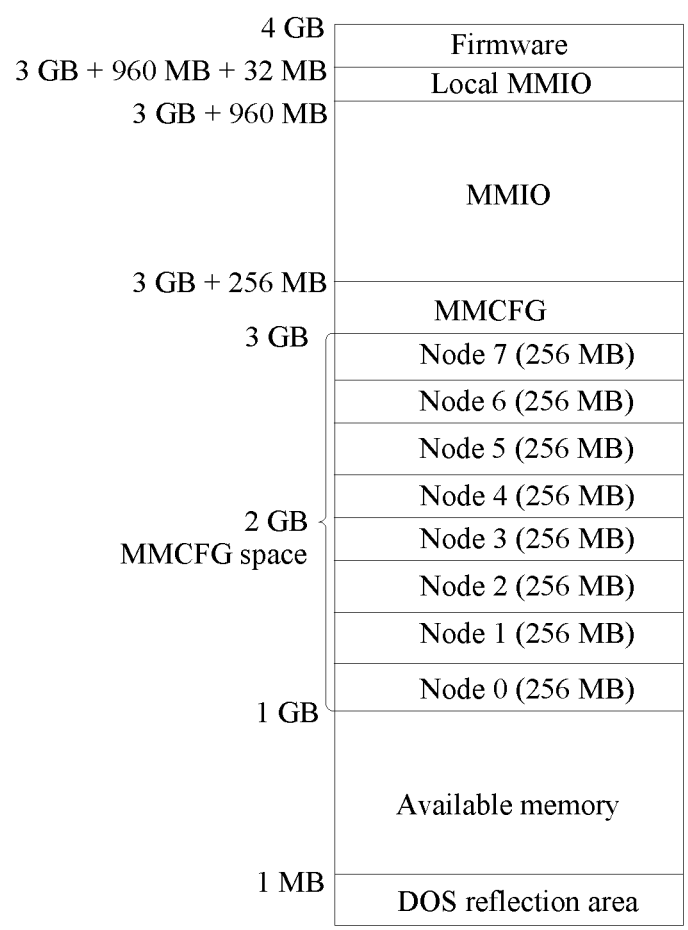
FIG. 2 is a schematic diagram of an addressing solution in a BIOS startup phase according to the prior art.

According to the address space allocation shown in FIG. 2, 2 GB of a storage space below 4 GB is occupied by the MMCFG. After requirements of system functions are ensured, only 704 MB (3 GB+256 MB to 3 GB+960 MB) in the MMIO space can be allocated to the 32 CPUs for use. Because a minimum allocation granularity of the MMIO space is 16 MB, when 704 MB is allocated to the 32 CPUs for use, only a 16 MB MMIO space can be allocated to each CPU. In this case, for some PCIE devices that require MMIO spaces more than 8 MB, each CPU can support a maximum of one similar PCIE device, and product applications are limited. If a PCIE card requires an MMIO space more than 16 MB, the CPU cannot support the PCIE card, and compatibility with the PCIE device is affected. As a quantity of processors in the large-scale x86 CC-NUMA system increases, occupied MMCFG spaces below 4 GB also increase. Consequently, the MMIO spaces and address spaces of available memories below 4 GB are reduced, and use of PCIE devices is limited.

A BIOS startup method provided by an embodiment of this application is applied to BIOS startup of a node in a large-scale CC-NUMA system. The startup method may be performed by a BIOS startup apparatus. The BIOS startup apparatus may include some or all processors of a node in the large-scale CC-NUMA system, and the node in the large-scale CC-NUMA system may be a master node or a slave node. The master node is a node that can perform unified control and management in a subsequent node combination step, and nodes other than the master node are referred to as slave nodes.

Figure 3:
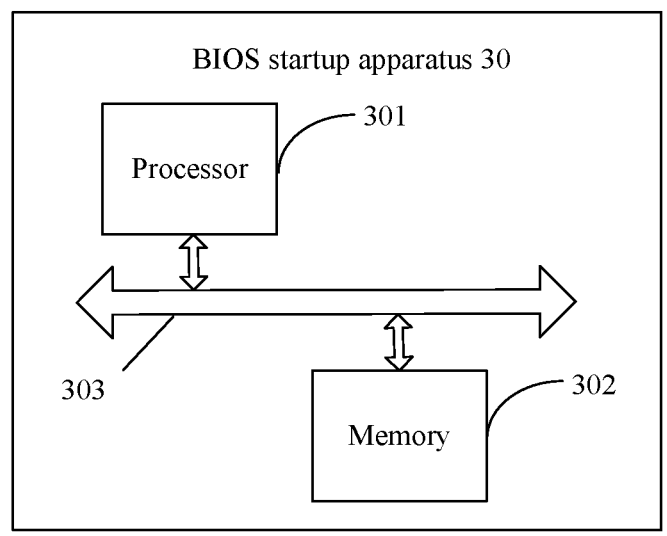
FIG. 3 is a structural diagram of a BIOS startup apparatus according to an embodiment of this application.

In this embodiment of this application, the BIOS startup apparatus is located in a current node (namely, "a local node") in the CC-NUMA system, and the current node may be the master node or any slave node in the CC-NUMA system. The BIOS startup apparatus may include some or all processors in the current node. As shown in FIG. 3, the BIOS startup apparatus in this embodiment includes a processor 301, a memory 302, and a communications bus 303.

The processor 301 may be one or more CPUs in the current node, and may be configured to execute a corresponding program by reading program code stored in the memory.

The memory 302 may include a physical memory corresponding to one or more CPUs and some non-volatile storage media (for example, flash and a magnetic disk), and is used to store program code and various types of data generated in a program running process.

The communications bus 303 is configured to complete communication between the processor and the memory and other devices (not shown in FIG. 3). The communications bus may be an industry standard architecture (Industry Standard Architecture, ISA) bus, a peripheral component interconnect (Peripheral Component, PCI) bus, or an extended industry standard architecture (Extended Industry Standard Architecture, EISA) bus, or the like. The bus 303 may include an address bus, a data bus, a control bus, or the like. For ease of expression, the bus in FIG. 3 is indicated only by a bold line. However, this does not mean that only one bus or one type of bus exists.

Embodiment 1

Figure 4:
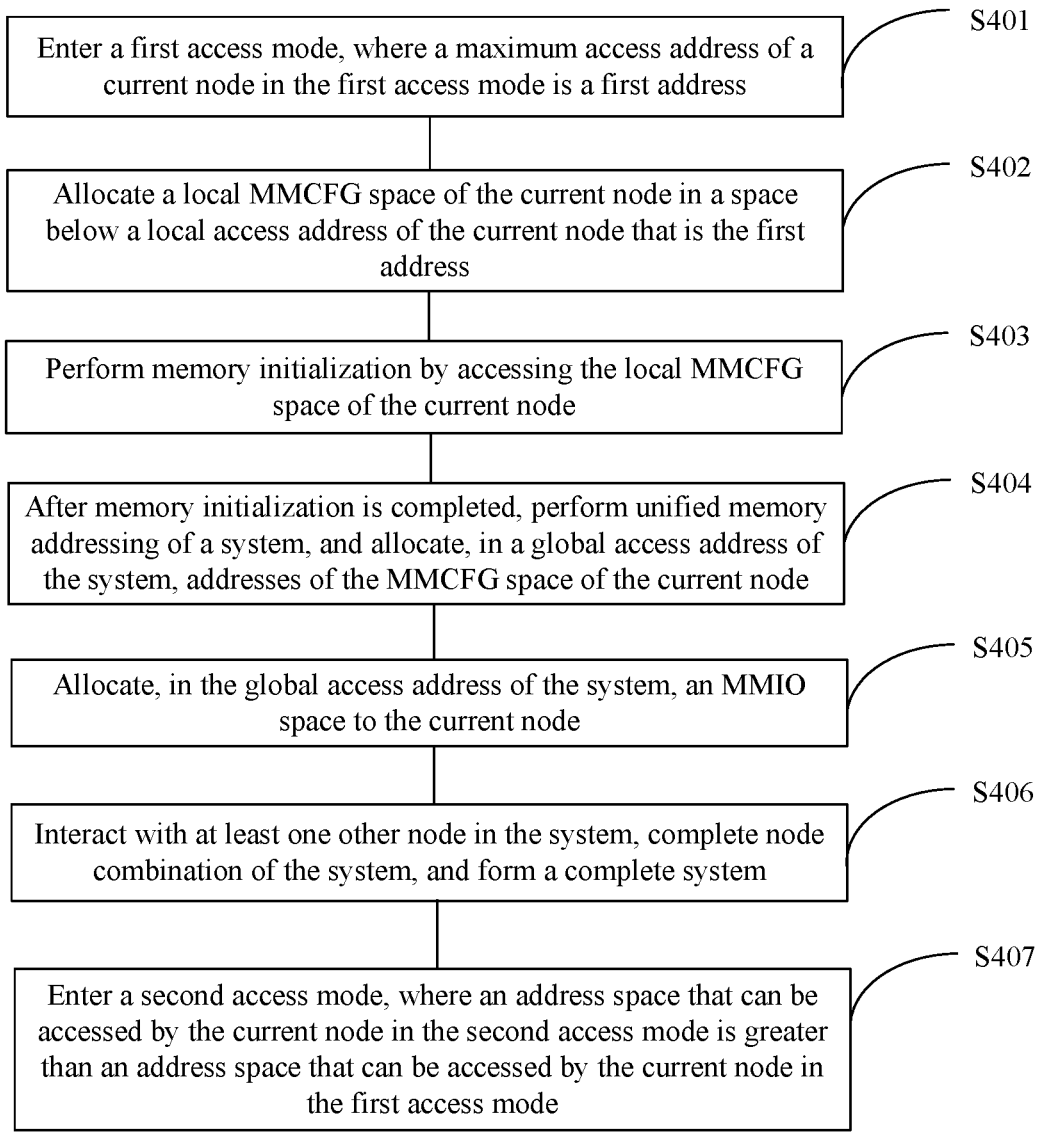
FIG. 4 is a schematic flowchart of a BIOS startup method according to an embodiment of this application.

Referring to FIG. 4, a BIOS startup method in Embodiment 1 of this application is performed by a current node, and includes the following steps.

S401. Enter a first access mode, where a maximum access address of a current node in the first access mode is a first address, and perform the following steps S402 to S407 in the first access mode.

In this embodiment, an "access mode" is a mode in which a processor (CPU) performs addressing by using a bus of a particular width. For example, generally a 32-bit or 64-bit bus is used to perform addressing. In this embodiment, a maximum space that can be addressed in the first access mode is smaller than a maximum space that can be addressed in a second access mode described later. For example, in this embodiment, the first access mode is a 32-bit access mode, that is, performing addressing by using the 32-bit bus, and the maximum addressing space (namely, the "first address" in step S401) is 4 GB. Correspondingly, the second access mode may be a 64-bit access mode or an access mode with other bits (more than 32 bits).

S402. Allocate a local MMCFG space of the current node in a space below a local access address of the current node that is the first address.

The local MMCFG space of the current node is a continuous space. Because the current node may include one or more CPUs, when there are a plurality of CPUs, MMCFG spaces corresponding to the CPUs are successive spaces.

Optionally, in a large-scale CC-NUMA system, addresses of local MMCFG spaces allocated to nodes in step S402 may be the same or different. In an actual application, the addresses may be determined according to an actual requirement. This is not specifically limited in this application.

S403. Perform memory initialization by accessing the local MMCFG space of the current node.

Optionally, when performing memory initialization in step S403, a boot strap processor (Boot Strap Processor, BSP) of a master CPU in the current node may wake up other CPUs (specifically, wake up BSPs of the other CPUs), so that the other CPUs perform memory initialization separately. A BSP may be considered as a core in a CPU, and when the CPU is powered on, the core obtains an execute permission for code in a contention mode. A specific implementation also pertains to the prior art, and is not described herein.

Memory initialization means that each CPU in the current node detects, by reading from or writing into the local MMCFG space (including a register space of a memory controller) of the current node, one or more physical memories connected to the CPU, obtains basic information (capacity, frequency, time sequence, and the like) of the connected memory, and then configures the connected memory (including configuring the memory controller and the memory).

Optionally, the memory initialization performed in step S403 may be performed by the BSP of the master CPU in the current node in a serial (also referred to as "single-thread", in which the BSP of the master CPU completes memory initialization of the other CPUs) or parallel (also referred to as "multithread", in which the BSP of the master CPU wakes up the BSPs of the other CPUs to complete memory initialization) mode. Content and an implementation process of memory initialization in this embodiment both pertain to the prior art. Details are not described in this embodiment.

S404. After memory initialization is completed, perform unified memory addressing of a system, and allocate, in a global access address of the system, addresses of the MMCFG space of the current node, where an entirety or a part of the MMCFG space of the current node is a space that is above the global access address being the first address and can be accessed in a second access mode.

Herein the "global access address" is an address after unified addressing. Each CPU of each node accesses various devices (such as a register, a peripheral component, a physical memory, and the like) by using this address after unified addressing.

Further, when unified memory addressing is performed, addresses of an allocated MMCFG space of one node in the CC-NUMA system do not overlap addresses of an MMCFG space of any other node in the global access address, that is, no conflict should occur between addresses of MMCFG spaces of the nodes in the global access address during access.

Further, addresses of an MMCFG space of each node in the CC-NUMA system are successive in the global access address. In this way, access is more regular, and unified access is facilitated.

S405. Allocate, in the global access address of the system, an MMIO space to the current node.

Specifically, in the global access address, an access address supported by a peripheral component of the current node may be allocated to the current node as the MMIO space of the current node according to the access address supported by the peripheral component connected to the node.

Optionally, the MMIO space allocated to the current node may be below the first address in the global access address of the system, or may be above the first address in the global access address of the system. This is not specifically limited in this embodiment of this application.

Further, because some or all addresses of the MMCFG space of the node in the system are already configured in the space that is above the global access address of the system being the first address and can be accessed in the second access mode, a large space in a storage space below the global access address of the system being the first address may be allocated as the MMIO space.

S406. Interact with at least one other node in the system, complete node combination of the system, and form a complete system.

Each node is started separately at the beginning, and there is no contact between the nodes. After this step is performed, mutual interactions between the nodes may allow the master node to collect information about the other nodes and may allow the master node to perform unified control, so that the complete system is formed. This process is referred to as the "node combination".

Optionally, the process of performing step S406 varies depending on the type of the current node. Specifically, the following two cases may be included:

Case 1: The current node is the master node.

In the case 1, the interacting with at least one other node in the system, completing node combination of the system, and forming a complete system may include:

sending a notification message to each slave node in the large-scale CC-NUMA system in which the current node is located, where the notification message is used to instruct the slave node to send system information about the slave node to the master node; and separately receiving the system message sent by each slave node about the slave node, continuing to execute remaining BIOS startup, subsequently waking up the slave node, and allocating a corresponding task to the slave node for execution.

In another embodiment, the nodes may be interconnected by some interconnect chips (also referred to as node controllers (Node Controller, NC)) to implement mutual communication between the nodes. The implementation is based on the prior art. Details are not described herein.

Case 2: The current node is the slave node.

In the case 2, the interacting with at least one other node in the system, completing node combination of the system, and forming a complete system may include:

terminating a BIOS startup process of the slave node, waiting for being waked up by the master CPU and being allocated a corresponding task, and executing the task;

receiving a notification message that is sent by the master node and used to instruct the slave node to send system information about the slave node to the master node; and sending the system message about the slave node to the master node, where the system message is used by the master node to complete the node combination of the system and form the complete system.

It should be noted that, the node combination process is not described in detail in this embodiment of this application.

Further optionally, step S406 may include: after accessing a central processing unit CPU register for a last time, interacting with the at least one other node in the system, completing the node combination of the system, and forming the complete system.

Further, after the node combination is completed, all controls are handed over to the BSP of the master CPU of the master node.

S407. Enter the second access mode, where an address space that can be accessed by the current node in the second access mode is greater than an address space that can be accessed by the current node in the first access mode.

Preferably, in an x86 system, the second access mode may be a 64-bit mode.

In a later period of a PEI phase in a BIOS phase, the system enters the second access mode from the first access mode, and may address an address above the first address in the global access address of the system.

Optionally, before step S407, the method may further include:

configuring a page table in the space below the local access address of the current node that is the first address (4 GB), where the page table points to an address space that can be accessed by the current node in the second access mode and cannot be accessed by the current node in the first access mode.

For example, because a system management mode (System Manage Mode, SMM) supports only 32 bits, and the addresses of the MMCFG space of the node in the global access address of the system are allocated above 4 GB, the MMCFG space cannot be accessed in the SMM, and functions of the system are incomplete. In this application, the page table is created in a 32-bit space, and when the 64-bit mode is entered, the MMCFG space above 4 GB in the global access address of the system can be accessed according to an instruction of the page table.

Configuring the page table and accessing the MMCFG space above the first address in the global access address of the system pertain to the prior art. Details are not described in this embodiment.

The BIOS startup method provided by this embodiment of this application is applied to the master node or the slave node in the large-scale CC-NUMA system. In the first access mode, the current node allocates the local MMCFG in the space below the local access address of the current node that is the first address, and completes memory initialization; and when performing unified memory addressing of the system, the current node moves positions of addresses of a part or an entirety of the MMCFG space of the current node from the original space below the first address in the global access address of the system to a space that is above the first address and can be accessed in the second access mode. This ensures that a CPU can still access the addresses of the MMCFG space in the global access address of the system in the second access mode. In addition, spaces that are below the first address and are saved by moving may be reserved for devices (for example, more MMIO spaces are reserved for use by PCIe cards that can be accessed only below 4 GB, and more available memory spaces are reserved for use by the system) that can be used only in the spaces. Even if a quantity of CPUs included in the CC-NUMA system is extended continuously, the addresses of the MMCFG space in the global access address of the system may not occupy any space below the first address, and therefore, more PCIE devices can be supported. Therefore, BIOS startup does not affect available spaces of an MMIO space and an available memory space in a lower address while the quantity of CPUs included in the large-scale CC-NUMA system is extended, and large-scale CC-NUMA system is more compatible with PCIE devices and an operating system.

Embodiment 2

Based on the foregoing embodiments, step S402 in Embodiment 1 is described in detail in this embodiment.

Figure 5:
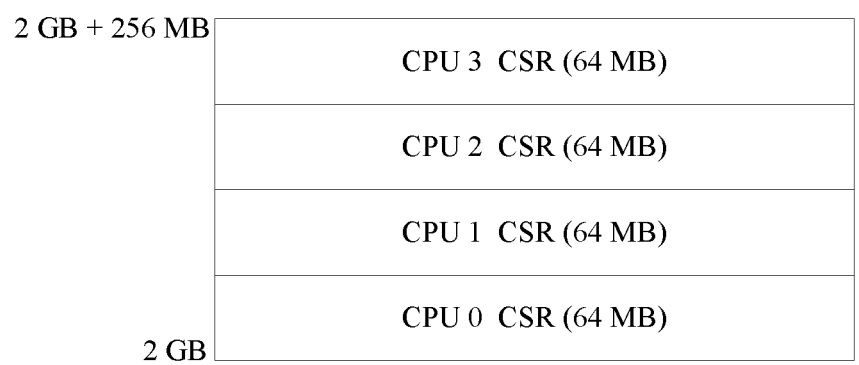
FIG. 5 is a schematic diagram of MMCFG space addressing according to an embodiment of this application.

For example, as shown in FIG. 5, for example, the current node includes four CPUs, denoted as a CPU 0, a CPU 1, a CPU 2, and a CPU 3 respectively, and a local MMCFG space of a 64 kilobyte (kilobyte, KB) size is allocated to each CPU. An allocation result is as follows: The CPU 0 is allocated an MMCFG space of 2 GB to 2 GB+64 MB, the CPU 1 is allocated an MMCFG space of 2 GB+64 MB to 2 GB+64 MB+64 MB, and so on.

Therefore, the local MMCFG spaces of the four CPUs are successive. When accessing an address of 2 GB+64 MB, the CPU 0 may access the MMCFG space of the CPU 1, and may operate a control and status register (Control and Status Register, CSR) register of the CPU 1; when accessing an address of 2 GB, the CPU 1 may access the MMCFG space of the CPU 0, and operate a CSR register of the CPU 0, and so on. In this way, any CPU of the current node can access CSR registers of other CPUs in the node.

Specifically, the allocating a local MMCFG space of the current node may be implemented by configuring a register.

By configuring an MMCFG_Rule register, the current node may allocate, in the space below the local access address of the current node that is the first address, a space segment as a local MMCFG space of a node, and by configuring an MMCFG_Target_LIST register, set the local MMCFG space allocated by configuring the MMCFG_Rule register, as the local MMCFG space of the current node.

For example, MMCFG_Rule is a register in a CPU for setting an MMCFG space. In a BIOS startup phase, a start address of a space specified in a Base Address (base address) field of the MMCFG_Rule register is set by using BIOS code, where a Length (length) field specifies a size of the space, and Rule Enable (rule enable) specifies whether the rule is effective.

Fields Package0 to Package7 of the MMCFG_Target_LIST register specify a node identifier node ID corresponding to an MMCFG space, so as to specify that the allocated local MMCFG space is a local MMCFG space of a node.

For example, the following uses an example to describe how to allocate, configuring a register, the local MMCFG space of the current node shown in FIG. 5. Specifically, an implementation process of the allocation is to configure registers eax, xmm2, xmm3, xmm4, and xmm5 of the CPU.

A specific setting process may be as follows:

mov eax, DEFAULT_COLDBOOT_MMCFG_TARGET_LIST
    movd xmm2, eax
    mov eax, DEFAULT_COLDBOOT_MMCFG_RULE
    movd xmm3, eax
    mov eax, DEFAULT_COLDBOOT_IIO_BUS_NUMS
    movd xmm4, eax
    mov eax, DEFAULT_COLDBOOT_UNCORE_BUS_NUMS
    movd xmm5, eax It should be noted that, in the foregoing example, the base address (Base Address) of the local MMCFG space allocated to the current node is 2 GB. This is merely an example, and is not intended to specifically limit a value of the base address. In an actual application, the base address may be changed according to an actual requirement.

It should also be noted that, the foregoing example is merely an example for describing an implementation means of step S402, and is not intended to specifically limit a manner of performing step S402.

Embodiment 3

Based on the foregoing embodiments, step S404 in the foregoing embodiments is described in detail in this embodiment.

For example, the current node may allocate, in the global access address, the addresses of the MMCFG space by configuring a DRAM Rule register, and may set, by configuring an INTERLEAVE_LIST register, the addresses of the MMCFG space allocated in the global access address by the DRAM Rule register, as the MMCFG space of the current node.

The DRAM Rule register is used for address allocation in a 0 MB address to a maximum address space in the memory.

Specifically, a Limit field in registers DRAM_RULE_0 to DRAM_RULE_19 is set to specify a space upper limit address, an attr field specifies whether the space is used for a DRAM or an MMCFG space, and a RULE_ENABLE field specifies whether the rule for allocating the memory space of the CPU in the node is effective.

For example, the large-scale CC-NUMA system is a 32-CPU system, the first access mode is a 32-bit mode, the first address is 4 GB, the current node is a node 0, and the node 0 includes four CPUs. In a position above 4 GB in the global access address, an MMCFG space of 256 MB in total is allocated to the CPUs of the node 0. After the mode switches to the 64-bit mode, the MMCFG space of the node 0 in the global access address is read and a CSR of a CPU is accessed.

Specifically, content of the configured registers is shown in the following Table 1. In the global access address, addresses of an MMCFG space of 32 trillion bytes (Trillion byte, TB)+4 GB to 32 TB+4 GB+256 MB, 256 MB in total, are allocated to the node 0. In the global access address, addresses of MMCFG spaces of other nodes are 32 TB+4 GB+256 MB to 32 TB+4 GB+2 GB. In the example, in the global access address, the addresses of the allocated MMCFG spaces of the eight nodes in the large-scale CC-NUMA system are shown in FIG. 6.

TABLE 1

| Register identifier | Limit field | Attr field | Enable field |
| --- | --- | --- | --- |
| DRAM_RULE15-19 | x | x | 0 |
| DRAM_RULE14 | 32 TB + 4 GB + 2 GB | MMCFG space | 1 |
| DRAM_RULE13 | 32 TB + 4 GB + 256 MB | MMCFG space | 1 |
| DRAM_RULE12 | 32 TB + 4 GB + 192 MB | MMCFG space | 1 |
| DRAM_RULE11 | 32 TB + 4 GB + 128 MB | MMCFG space | 1 |
| DRAM_RULE10 | 32 TB + 4 GB + 64 MB | MMCFG space | 1 |
| DRAM_RULE9 | 32 TB + 4 GB | DRAM | 1 |
| DRAM_RULE8 | 32 TB | DRAM | 1 |
| DRAM_RULE7 | 24 TB | DRAM | 1 |
| DRAM_RULE6 | 16 TB | DRAM | 1 |
| DRAM_RULE5 | 10 TB | DRAM | 1 |
| DRAM_RULE4 | 9 TB | DRAM | 1 |
| DRAM_RULE3 | 8 TB | DRAM | 1 |
| DRAM_RULE2 | 2 TB | DRAM | 1 |
| DRAM_RULE1 | 1 TB | DRAM | 1 |
| DRAM_RULE0 | 2 GB | DRAM | 1 |

It should be noted that, in the foregoing example, in the global access address, a base address 32 TB+4 GB of the MMCFG space allocated to the node in the system is merely as an example, and is not intended to specifically a value of the base address. In an actual application, the base address may be changed according to an actual requirement.

Table 1 further includes other register configurations in addition to register configurations for allocating, in the global access address, the MMCFG spaces of the nodes in the system. The other register configurations are configured according to a system rule. Table 1 is merely an example, and is not specifically limited.

It should be noted that, the register configurations in Table 1 are merely examples for describing the process of allocating, in the global access address, addresses of the MMCFG spaces by configuring the registers, and are not intended to specifically limit the process.

For example, fields Package0 to Package7 of the registers INTERLEAVE_LIST_0 to INTERLEAVE_LIST_N are set to specify a node identifier node ID to which an MMCFG space allocated by each DRAM_RULE register points.

It should also be noted that, the foregoing example is merely an example for describing an implementation means of step S404, and is not intended to specifically limit a manner of performing step S404.

Further, when step S404 is performed, in the global access address of the system, the addresses of the MMCFG space of the current node need to be allocated in the space that is above the global access address being the first address and can be accessed in the second access mode, but the current mode is the first access mode; therefore, in this case, the current node cannot access the MMCFG space of the current node, and the master node may reserve a local MMCFG space of the master node; and all nodes in the system perform unified memory addressing of the system by accessing the MMCFG space of the master node, and respectively allocate, in the global access address of the system, the addresses of the MMCFG spaces of the nodes.

Further, if the current node is the master node, before performing step S404, the method may further include:

reserving the local MMCFG space of the master node, used by each node in the system to perform unified memory addressing of the system and allocate, in the global access address of the system, addresses of the MMCFG space of the node.

Further, the reserved local MMCFG space of the master node below the first address may be not only used by each node in the system to perform unified memory addressing of the system and allocate, in the global access address of the system, the addresses of the MMCFG space of each node, but also used when only a space below the first address can be accessed when some drivers need to access some hardware device configuration registers in the first access mode, so as to improve system compatibility when the MMCFG space is accessed.

Specifically, assuming that the first address is below 4 GB and that the first access mode is the 32-bit mode, the reserved local MMCFG space of the master node below 4 GB may be not only used by each node in the system to perform unified memory addressing of the system and allocate, in the global access address of the system, the addresses of the MMCFG space of each node, but also used when only a space below 4 GB can be accessed when some drivers need to access some hardware device configuration registers in the 32-bit mode. This improves system compatibility properly when the MMCFG space is accessed.

Specifically, a plurality of modes (for example, a register mode and a port mode) are available for accessing the MMCF and some access modes (for example, the port mode) support access to the space below the first address only. Therefore, the reserved local MMCFG space of the master node below the first address may be compatible with the access modes that support access to the space below the first address only. This improves system compatibility when the MMCFG space is accessed.

Embodiment 4

Based on the foregoing embodiments, step S405 in the foregoing embodiments is described in detail in this embodiment.

For example, unified addressing of MMIO spaces of all nodes is performed in the address space below the first address in the global access address of the system by configuring registers MMIO Rule0 to MMIO Rule15, MMIO_Target_LIST_0, and MMIO_Target_LIST_1. This greatly improves compatibility of the multi-CPU system with PCIE devices.

An MMIO Rule register is used to allocate an MMIO space to each CPU. A Base Address field of the MMIO Rule register is set to specify a space base address, a Limit Address field specifies a space upper limit address, and Rule Enable specifies whether the rule is effective.

Fields Package0 to Package7 of the MMIO_Target_LIST_0 register are configured to specify a node to which an MMIO space set by the MMIO RULE register belongs, reflected by a node identifier node ID.

It should be noted that, a size of the MMIO space of each CPU may be adjusted freely. A base address of the MMIO space may also be changed below the first address in the global access address of the system, or may be changed above the first address in the global access address of the system. This is not specifically limited in this application.

For example, assuming that the first access mode is the 32-bit mode, in the space below 4 GB in the global access address of the system, an MMIO space is allocated to four CPUs of the node 0 in the 32-CPU CC-NUMA system. An MMIO space of 2 GB+256 MB to 2 GB+640 MB, 384 MB in total, is allocated to the node 0. Content of each field of the configured MMIO_RULE register is shown in Table 2. The allocated MMIO spaces in the example are shown in FIG. 7.

TABLE 2

| Register identifier | Base address | Limit address | Enable |
| --- | --- | --- | --- |
| MMIO_RULE6 | 2 GB + 976 MB | 2 GB + 992 MB | 1 |
| MMIO_RULE5 | 2 GB + 960 MB | 2 GB + 976 MB | 1 |
| MMIO_RULE4 | 2 GB + 640 MB | 2 GB + 960 MB | 1 |
| MMIO_RULE3 | 2 GB + 608 MB | 2 GB + 640 MB | 1 |
| MMIO_RULE2 | 2 GB + 576 MB | 2 GB + 608 MB | 1 |
| MMIO_RULE1 | 2 GB + 512 MB | 2 GB + 576 MB | 1 |
| MMIO_RULE0 | 2 GB + 256 MB | 2 GB + 512 MB | 1 |

In Table 2, configurations of MMIO_RULE0 to MMIO_RULE3 are used to allocate an MMIO space to the node 0; configurations of MMIO_RULE4 to MMIO_RULE6 are configured according to a system rule, and fields Package4 to Package6 of the MMIO_Target_LIST_0 register are configured to specify that the MMIO interval set by the MMIO_RULE register points to an NC, so that the NC subsequently performs processing and implements node interconnection.

It should be noted that, the register configurations in Table 2 are merely examples for describing the process of allocating an MMIO space in the storage space below 4 GB in the global access address of the system by configuring a register, and are not intended to specifically limit the process.

Figure 8:
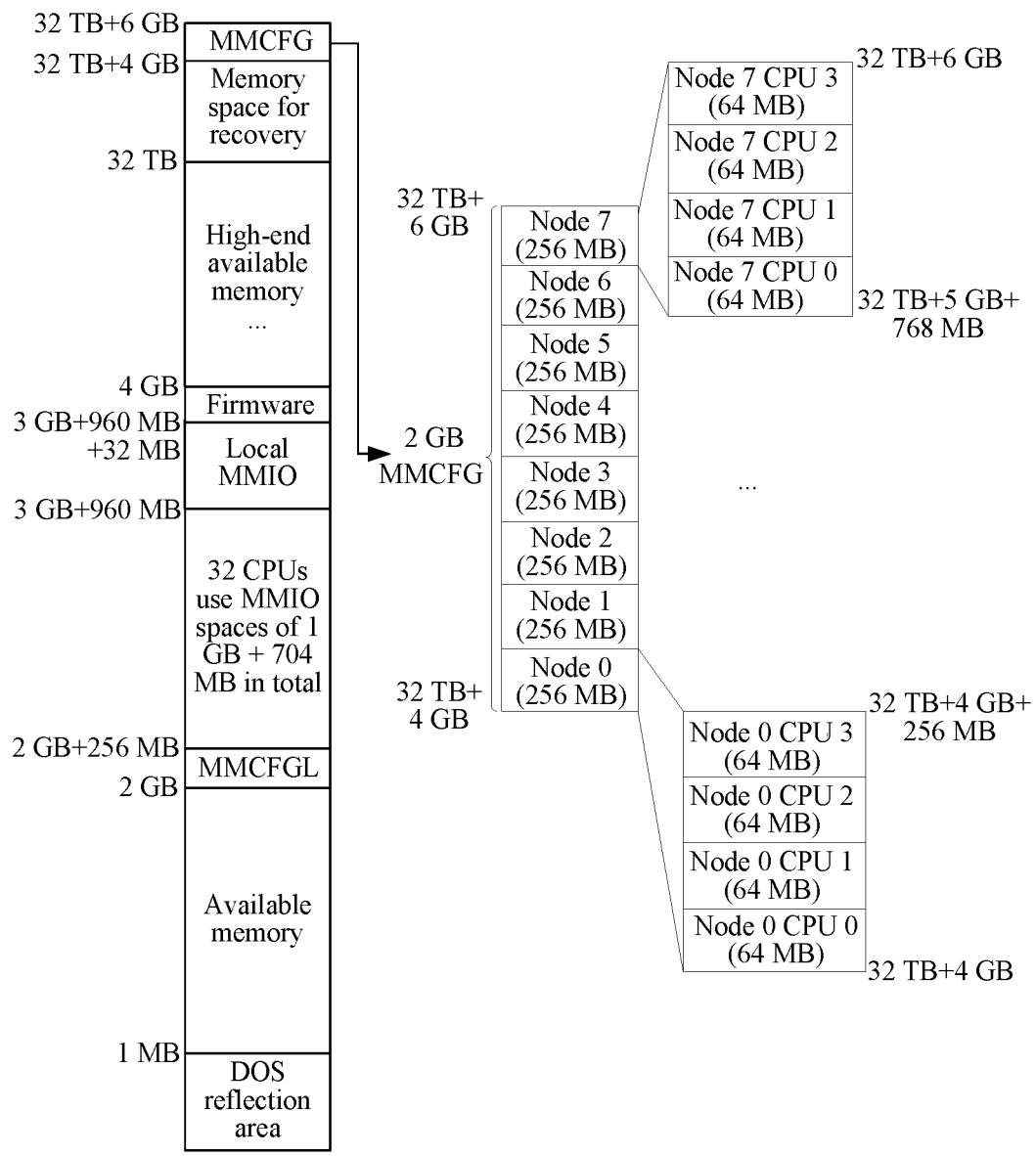
FIG. 8 is a schematic diagram of an addressing solution in a BIOS startup phase according to an embodiment of this application.

For example, the large-scale CC-NUMA system has 32 CPUs, and four CPUs perform BIOS startup based on one node. According to the example in the foregoing S401 to S405, the solution of this application is performed. After unified addressing, an allocation result of the global access address of the system may be shown in FIG. 8.

Embodiment 5

Based on the foregoing embodiments, this embodiment of this application provides another BIOS startup apparatus 90. The BIOS startup apparatus 90 is included in a current node. The current node is a master node or a slave node in a CC-NUMA system. The CC-NUMA system includes one master node and at least one slave node.

Figure 9:
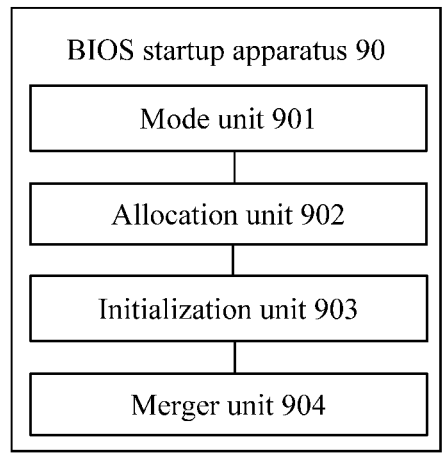
FIG. 9 is a structural diagram of a BIOS startup apparatus according to an embodiment of this application.

As shown in FIG. 9, the startup apparatus 90 may include:

a mode unit 901, configured to control the system to enter a first access mode, where a maximum access address of the current node in the first access mode is a first address;

an allocation unit 902, configured to allocate a local MMCFG space of the current node in a space below a local access address of the current node that is the first address;

an initialization unit 903, configured to perform memory initialization by accessing the local MMCFG space of the current node that is allocated by the allocation unit 902; where the allocation unit 902 is further configured to: after the initialization unit 903 completes memory initialization, perform unified memory addressing of the system, and allocate, in a global access address of the system, addresses of the MMCFG space of the current node, where an entirety or a part of the MMCFG space of the current node is a space that is above the global access address being the first address and can be accessed in a second access mode; and the allocation unit 902 is further configured to allocate, in the global access address of the system, an MMIO space to the current node; and a merger unit 904, configured to interact with at least one other node in the system, complete node combination of the system, and form a complete system.

Preferably, the first address may be 4 GB.

Further, the allocation unit 902 may be specifically configured to:

by accessing a local MMCFG space of the master node, perform unified memory addressing of the system, and allocate, in the global access address of the system, the addresses of the MMCFG space of the current node.

Figure 10:
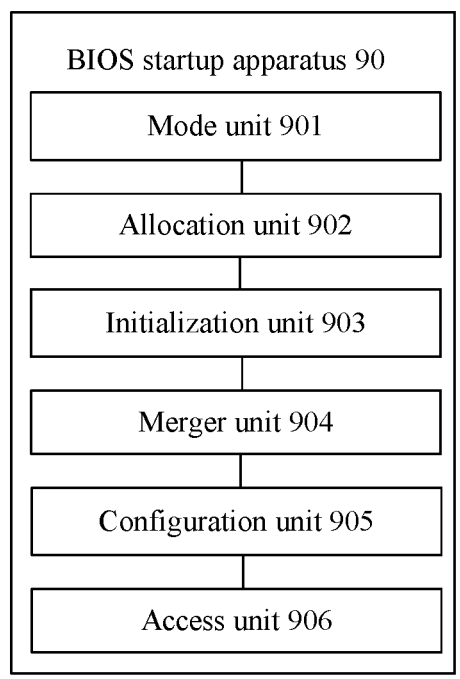
FIG. 10 is a structural diagram of still another BIOS startup apparatus according to an embodiment of this application.

As shown in FIG. 10, the startup apparatus 90 may further include:

a configuration unit 905, configured to configure, before the mode unit 901 controls the system to enter the second access mode from the first access mode, a page table in the space below the local access address of the current node that is the first address, where the page table points to an address space that can be accessed by the current node in the second access mode and cannot be accessed by the current node in the first access mode; and an access unit 906, configured to access, in the global access address of the system after the mode unit 901 controls the system to enter the second access mode from the first access mode, an address of the MMCFG space of the current node according to the page table configured by the configuration unit 905.

Further, in the global access address of the system, addresses of an MMCFG space of one node do not overlap addresses of an MMCFG space of any other node in the CC-NUMA system.

Further, addresses of an MMCFG space of each node in the CC-NUMA system are successive in the global access address of the system, and a first one of addresses of an MMCFG space of a node in the global access address of the system is a last one of addresses of an MMCFG space of another node in the global access address of the system.

Optionally, the current node is the master node, the merger unit 904 may be specifically configured to:

send a notification message to each slave node in the CC-NUMA system, where the notification message is used to instruct the slave node to send system information about the slave node to the master node; and separately receive the system message sent by each slave node about the slave node, complete the node combination of the system, and form the complete system.

Optionally, if the current node is the slave node, the merger unit 904 may be specifically configured to:

terminate a BIOS process of the slave node;

receive a notification message that is sent by the master node and used to instruct the slave node to send system information about the slave node to the master node; and send the system message about the slave node to the master node, where the system message is used by the master node to complete the node combination of the system and form the complete system.

Further, the merger unit 904 may be specifically configured to:

after accessing a CPU register for a last time, interact with the at least one other node in the system, complete the node combination of the system, and form the complete system.

Same as in the foregoing embodiments, in this embodiment of this application, more spaces below 4 GB may be reserved for use by peripheral components (such as PCIE cards) of nodes, and compatibility of the large-scale CC-NUMA system with peripheral components is improved.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A basic input/output system (BIOS) startup method, applied to a current node, wherein the current node is a master node or a slave node in a large-scale cache coherent non-uniform memory access CC-NUMA architecture system, the system comprises one master node and at least one slave node, and the method comprises:
   entering a first access mode, wherein a maximum access address of the current node in the first access mode is a first address, and performing the following steps in the first access mode:
   allocating a local memory mapped configuration MMCFG space of the current node in a space below a local access address of the current node that is the first address;
   performing memory initialization by accessing the local MMCFG space of the current node;
   after memory initialization is completed, performing unified memory addressing of the system, and allocating, in a global access address of the system, addresses of the MMCFG space of the current node, wherein an entirety or a part of the MMCFG space of the current node is a space that is above the global access address being the first address and can be accessed in a second access mode;
   allocating, in the global access address of the system, a memory mapped input/output MMIO space to the current node; and
   interacting with at least one other node in the system, completing node combination of the system, and forming a complete system; and
   entering the second access mode, wherein an address space that can be accessed by the current node in the second access mode is greater than an address space that can be accessed by the current node in the first access mode.

2. The method according to claim 1, wherein the first address is 4 gigabytes GB.

3. The method according to claim 1, wherein the performing unified memory addressing of the system, and allocating, in a global access address of the system, addresses of the MMCFG space of the current node comprises:
   by accessing a local MMCFG space of the master node, performing unified memory addressing of the system, and allocating, in the global access address of the system, the addresses of the MMCFG space of the current node.

4. The method according to claim 1, wherein before the entering the second access mode, the method further comprises:
   configuring a page table in the space below the local access address of the current node that is the first address, wherein the page table points to an address space that can be accessed by the current node in the second access mode and cannot be accessed by the current node in the first access mode; and
   after the entering the second access mode, the method further comprises:
   accessing, in the global access address of the system, an address of the MMCFG space of the current node according to the page table.

5. The method according to claim 1, wherein in the global access address of the system, addresses of an MMCFG space of one node do not overlap addresses of an MMCFG space of any other node in the CC-NUMA system.

6. The method according to claim 1, wherein addresses of an MMCFG space of each node in the CC-NUMA system are successive in the global access address of the system, and a first one of addresses of an MMCFG space of a node in the global access address of the system is a last one of addresses of an MMCFG space of another node in the global access address of the system.

7. The method according to claim 1, wherein the current node is the master node, the interacting with at least one other node in the system, completing node combination of the system, and forming a complete system comprises:
   sending a notification message to each slave node in the CC-NUMA system, wherein the notification message is used to instruct the slave node to send system information about the slave node to the master node; and
   separately receiving the system information sent by each slave node about the slave node, completing the node combination of the system, and forming the complete system.

8. The method according to claim 1, wherein the current node is the slave node, the interacting with at least one other node in the system, completing node combination of the system, and forming a complete system comprises:
   terminating a BIOS process of the slave node;
   receiving a notification message that is sent by the master node and used to instruct the slave node to send system information about the slave node to the master node; and
   sending the system information about the slave node to the master node, wherein the system information is used by the master node to complete the node combination of the system and form the complete system.

9. The method according to claim 1, wherein the interacting with at least one other node in the system, completing node combination of the system, and forming a complete system comprises:
   after accessing a central processing unit CPU register for a last time, interacting with the at least one other node in the system, completing the node combination of the system, and forming the complete system.

10. A basic input/output system (BIOS) startup apparatus, wherein the startup apparatus is comprised in a current node, the current node is a master node or a slave node in a large-scale cache coherent non-uniform memory access CC-NUMA architecture system, the CC-NUMA system comprises one master node and at least one slave node, and the startup apparatus comprises:
    a mode unit, configured to control the system to enter a first access mode, wherein a maximum access address of the current node in the first access mode is a first address;
    an allocation unit, configured to allocate a local memory mapped configuration MMCFG space of the current node in a space below a local access address of the current node that is the first address;
    an initialization unit, configured to perform memory initialization by accessing the local MMCFG space of the current node that is allocated by the allocation unit; wherein
    the allocation unit is further configured to: after the initialization unit completes memory initialization, perform unified memory addressing of the system, and allocate, in a global access address of the system, addresses of the MMCFG space of the current node, wherein an entirety or a part of the MMCFG space of the current node is a space that is above the global access address being the first address and can be accessed in a second access mode; and the allocation unit is further configured to allocate, in the global access address of the system, a memory mapped input/output MMIO space to the current node; and a merger unit, configured to interact with at least one other node in the system, complete node combination of the system, and form a complete system; wherein the mode unit is further configured to control the system to enter the second access mode from the first access mode, wherein an address space that can be accessed by the current node in the second access mode is greater than an address space that can be accessed by the current node in the first access mode.

11. The apparatus according to claim 10, wherein the first address is 4 gigabytes GB.

12. The apparatus according to claim 10, wherein the allocation unit is specifically configured to:

by accessing a local MMCFG space of the master node, perform unified memory addressing of the system, and allocate, in the global access address of the system, the addresses of the MMCFG space of the current node.

13. The apparatus according to claim 10, wherein the apparatus further comprises:

a configuration unit, configured to configure, before the mode unit controls the system to enter the second access mode from the first access mode, a page table in the space below the local access address of the current node that is the first address, wherein the page table points to an address space that can be accessed by the current node in the second access mode and cannot be accessed by the current node in the first access mode; and an access unit, configured to access, in the global access address of the system after the mode unit controls the system to enter the second access mode from the first access mode, an address of the MMCFG space of the current node according to the page table configured by the configuration unit.

14. The apparatus according to claim 10, wherein in the global access address of the system, addresses of an MMCFG space of one node do not overlap addresses of an MMCFG space of any other node in the CC-NUMA system.

15. The apparatus according to claim 10, wherein addresses of an MMCFG space of each node in the CC-NUMA system are successive in the global access address of the system, and a first one of addresses of an MMCFG space of a node in the global access address of the system is a last one of addresses of an MMCFG space of another node in the global access address of the system.

16. The apparatus according to claim 10, wherein the current node is the master node, the merger unit is specifically configured to:

send a notification message to each slave node in the CC-NUMA system, wherein the notification message is used to instruct the slave node to send system information about the slave node to the master node; and separately receive the system information sent by each slave node about the slave node, complete the node combination of the system, and form the complete system.

17. The apparatus according to claim 10, wherein the current node is the slave node, the merger unit is specifically configured to:

terminate a BIOS process of the slave node;

receive a notification message that is sent by the master node and used to instruct the slave node to send system information about the slave node to the master node; and send the system information about the slave node to the master node, wherein the system information is used by the master node to complete the node combination of the system and form the complete system.

18. The apparatus according to claim 10, wherein the merger unit is specifically configured to:

after accessing a central processing unit CPU register for a last time, interact with the at least one other node in the system, complete the node combination of the system, and form the complete system.

* * * * *